(12) United States Patent
Jacqus et al.

(10) Patent No.: US 11,697,936 B2
(45) Date of Patent: Jul. 11, 2023

(54) GLASS WOOL ACOUSTIC PANEL AND PROCESS FOR MANUFACTURING SUCH A PANEL

(71) Applicants: SAINT-GOBAIN ISOVER, Courbevoie (FR); SAINT-GOBAIN PLACO, Courbevoie (FR)

(72) Inventors: Gary Jacqus, Paris (FR); Sylvain Berger, Paris (FR); Pierre Leroy, Saint Félix (FR); Erling Nilsson, Lund (SE); Delphine Dray, Pantin (FR)

(73) Assignees: SAINT-GOBAIN ISOVER, Courbevoie (FR); SAINT-GOBAIN PLACO, Courbevoie (FR)

( * ) Notice: Subject to any disclaimer, the term of this patent is extended or adjusted under 35 U.S.C. 154(b) by 489 days.

(21) Appl. No.: 16/755,443

(22) PCT Filed: Oct. 12, 2018

(86) PCT No.: PCT/EP2018/077818
§ 371 (c)(1),
(2) Date: Apr. 10, 2020

(87) PCT Pub. No.: WO2019/073019
PCT Pub. Date: Apr. 18, 2019

(65) Prior Publication Data
US 2020/0240136 A1 Jul. 30, 2020

(30) Foreign Application Priority Data

Oct. 13, 2017 (EP) .................................. 17196306

(51) Int. Cl.
| | | |
|---|---|---|
| *E04B 1/84* | (2006.01) | |
| *C03B 37/04* | (2006.01) | |
| *D04H 1/4218* | (2012.01) | |
| *G10K 11/162* | (2006.01) | |
| *G10K 11/172* | (2006.01) | |

(52) U.S. Cl.
CPC .......... *E04B 1/8409* (2013.01); *C03B 37/04* (2013.01); *D04H 1/4218* (2013.01); *D10B 2401/063* (2013.01); *G10K 11/162* (2013.01); *G10K 11/172* (2013.01)

(58) Field of Classification Search
CPC ............... G10K 11/172; G10K 11/162; D10B 2401/063; D04H 1/4218; C03B 37/04; E04B 1/8409
USPC .......................................................... 501/36
See application file for complete search history.

(56) References Cited

U.S. PATENT DOCUMENTS

| | | | | |
|---|---|---|---|---|
| 5,032,334 A | * | 7/1991 | Jonsson ................. | D04H 1/732 425/81.1 |
| 5,348,621 A | * | 9/1994 | Rudy ...................... | C08B 15/02 162/158 |
| 2004/0121114 A1 | * | 6/2004 | Piana ..................... | D06M 11/70 427/372.2 |
| 2007/0009728 A1 | * | 1/2007 | Aoki ........................ | B64F 1/26 428/304.4 |
| 2011/0111198 A1 | * | 5/2011 | Letourmy ............ | D04H 1/4226 428/221 |
| 2022/0100934 A1 | * | 3/2022 | Katsura ................... | G06F 30/17 |

FOREIGN PATENT DOCUMENTS

| | | | |
|---|---|---|---|
| DE | 103 24 257 B3 | 9/2004 | |
| FR | 2 745 597 A1 | 9/1997 | |
| FR | 2 993 265 A1 | 1/2014 | |
| JP | H09-170276 A | 6/1997 | |
| WO | WO-9910591 A1 * | 3/1999 | ............. C03C 25/26 |
| WO | WO 2009/112784 A1 | 9/2009 | |
| WO | WO 2014/108630 A1 | 7/2014 | |
| WO | WO-2019018508 A1 * | 1/2019 | ........... D04H 1/4209 |

OTHER PUBLICATIONS

International Search Report as issued in International Patent Application No. PCT/EP2018/077818, dated Dec. 14, 2018.
Langlois, C., et al., "Polynomial relations for quasi-static mechanical characterization of isotropic poroelastic materials," J. Acoust. Soc. Am. 110 (6), Dec. 2001, pp. 3032-3040.

* cited by examiner

*Primary Examiner* — Forrest M Phillips
(74) *Attorney, Agent, or Firm* — Pillsbury Winthrop Shaw Pittman LLP

(57) ABSTRACT

A glass wool panel, intended to be used as an acoustic panel, has a density of less than or equal to 130 kg/m$^3$, an air flow resistivity of between 30 and 120 kPa·s/m$^2$, a Young's modulus of between 0.5 and 4 MPa.

20 Claims, No Drawings

GLASS WOOL ACOUSTIC PANEL AND PROCESS FOR MANUFACTURING SUCH A PANEL

CROSS-REFERENCE TO RELATED APPLICATIONS

This application is the U.S. National Stage of PCT/EP2018/077818, filed Oct. 12, 2018, which in turn claims priority to European patent application number 17196306.9 filed Oct. 13, 2017. The content of these applications are incorporated herein by reference in their entireties.

The invention relates to a glass wool panel intended to be used as an acoustic panel, for example in a suspended ceiling system.

Acoustic ceiling panels that make it possible to combine both absorption and insulation performance are known on the market. However, these panels, for example made of rock wool or combining a mineral wool with a plasterboard, are generally very heavy. There are therefore difficult for the installers to handle. Furthermore, due to their weight, stresses are applied to the ceiling structures supporting the acoustic panels.

There is therefore a need for "lightweight" panels that make it possible to combine a high level of performance with respect to both sound absorption and sound insulation.

For this, the invention proposes a glass wool panel intended to be used as an acoustic panel and having:
  a density of less than or equal to 130 kg/m$^3$, preferably less than or equal to 120 kg/m$^3$, or less than or equal to 110 kg/m$^3$, or else less than or equal to 100 kg/m$^3$,
  an air flow resistivity of between 30 and 120 kPa·s/m$^2$, preferably of between 50 and 110 kPa·s/m$^2$, or of between 50 and 100 kPa·s/m$^2$, or else of between 50 and 90 kPa·s/m$^2$, or of between 50 and 80 kPa·s/m$^2$, and
  a Young's modulus of between 0.5 and 4 MPa, preferably of between 0.8 and 4 MPa, more preferably still of between 1.2 MPa and 4 MPa, or of between 1.5 MPa and 4 MPa, or else of between 2 MPa and 4 MPa.

According to another distinctive feature, the panel additionally has a micronaire of between 2.5/5 g and 6/5 g, preferably between 3/5 g and 6/5 g, or between 3.5/5 g and 6/5 g, or else between 4/5 g and 5/5 g.

According to another distinctive feature, the panel additionally has a thickness of greater than or equal to 25 mm, or greater than or equal to 30 mm, preferably greater than or equal to 35 mm, or greater than or equal to 40 mm, or else greater than or equal to 45 mm.

According to another distinctive feature, the panel additionally comprises a veil on each of its main faces.

According to another distinctive feature, the veil intended to be facing the side from where the sound to be absorbed originates having a specific air flow resistance of less than or equal to 1 kPa·s/m, preferably less than or equal to 0.5 kPa·s/m, and the opposite veil having a specific air flow resistance of greater than or equal to 1 kPa·s/m, preferably greater than or equal to 5 kPa·s/m, or greater than or equal to 10 kPa·s/m, or else airtight.

According to another distinctive feature, the panel comprises a weight content of binder of between 5% and 15% of the total weight, preferably between 6% and 10% of the total weight.

According to another distinctive feature, the panel has a sound absorption $\alpha_w$ of greater than or equal to 0.9.

According to another distinctive feature, the panel has a sound insulation $D_{n,f,w}$ of greater than or equal to 38 dB, preferably greater than or equal to 39 dB, or greater than or equal to 40 dB, or else greater than or equal to 41 dB, or greater than or equal to 42 dB.

The invention also relates to a process for manufacturing the glass wool panel as described above, comprising the following steps:
  manufacturing a mat of glass fibers by internal centrifugation, using equipment comprising:
    at least one centrifuge capable of rotating about an axis X, in particular a vertical axis, and the peripheral band of which is pierced by a plurality of orifices for delivering filaments of a molten material,
    a high-temperature gas attenuating means in the form of an annular burner that attenuates the filaments into fibers, and
    a receiving belt associated with suction means for receiving the fibers,
  crimping the mat of glass fibers with a degree of crimping of between 1.5 and 5, preferably of between 2 and 5, or of between 2.5 and 5, or else of between 3 and 5.

According to another distinctive feature, during the step of manufacturing the mat of glass fibers, a combination of parameters is regulated, from among at least:
  the viscosity of the molten glass, which is between 820 and 1500 poise, preferably between 950 and 1200 poise,
  the pressure of the burner, between 200 and 1000 mm WC, preferably between 200 and 600 mm WC,
  the total daily output of glass per centrifuge, which is between 14 metric tons/day and 23 metric tons/day, preferably between 17 and 22 metric tons/day,
  the number of holes of each centrifuge, which is between 5000 and 40 000, preferably between 15 000 and 35 000, and
  the rotational speed of the centrifuge at a speed greater than 2000 revolutions/minute.

According to another distinctive feature, the diameter of the orifices of each centrifuge is between 0.5 and 1.1 mm.

According to another distinctive feature, each centrifuge has a diameter of between 200 and 800 mm.

According to another distinctive feature, binder is projected onto the glass fibers before they fall onto the receiving belt, with a content of between 5% and 15% of the total weight, preferably of between 6% and 10% of the total weight, the mat of glass fibers being passed into a drying oven, preferably after crimping, in order to polymerize the binder.

According to another distinctive feature, a veil is adhesively bonded to each of the main faces of the glass wool panel.

The invention relates to a glass wool panel intended to be used as acoustic panel and having:
  a density of less than or equal to 130 kg/m$^3$, preferably less than or equal to 120 kg/m$^3$, or less than or equal to 110 kg/m$^3$, or else less than or equal to 100 kg/m$^3$,
  an air flow resistivity of between 30 and 120 kPa·s/m$^2$, preferably of between 50 and 110 kPa·s/m$^2$, or of between 50 and 100 kPa·s/m$^2$, or else of between 50 and 90 kPa·s/m$^2$, or of between 50 and 80 kPa·s/m$^2$, and
  a Young's modulus of between 0.5 and 4 MPa, preferably of between 0.8 and 4 MPa, more preferably still of between 1.2 MPa and 4 MPa, or of between 1.5 MPa and 4 MPa, or else of between 2 MPa and 4 MPa.

The panel according to the invention, with a density of 130 kg/m$^3$ at most is said to be "lightweight". Its acoustic properties (air flow resistivity and Young's modulus) make it an ideal candidate for use as an acoustic panel. The lighter the panel, the more manipulable it is and the fewer stresses it applies on the structure that supports it.

At the same time, the panel has very advantageous acoustic properties owing to a low air flow resistivity (between 30 and 120 kPa·s/m², preferably between 50 and 110 kPa·s/m², or between 50 and 100 kPa·s/m², or else between 50 and 90 kPa·s/m², or between 50 and 80 kPa·s/m²) and to a high Young's modulus (between 0.5 and 4 MPa, preferably between 0.8 and 4 MPa, more preferably still between 1.2 MPa and 4 MPa, or between 1.5 MPa and 4 MPa, or else between 2 MPa and 4 MPa). Specifically, within the ranges mentioned above, the lower the air flow resistivity, the better the sound absorption, and the higher the Young's modulus, the better the sound insulation.

The air flow resistivity is measured according to the ISO 9053 standard.

The Young's modulus is measured according to the ISO 18437 standard and according to the article by C. Langlois, R. Panneton and N. Atalla: Polynomial relations for quasi-static mechanical characterization of isotropic poroelastic materials, J. Acoust. Soc. Am., 110:3032-3040, 2001.

The measurements of the air flow resistivity and of the Young's modulus are carried out on the panel without the front/rear veils.

This glass wool panel is obtained by fiberizing by internal centrifugation then by crimping the glass fibers to a degree of crimping of between 1.5 and 5. The degree of crimping which has an influence on the air flow resistivity and on the Young's modulus. The degree of crimping is preferably between 2 and 5, or between 2.5 and 5, or else between 3 and 5 in order to further decrease the air flow resistivity and increase the Young's modulus. Specifically, crimping favors the orientation of the fibers along a direction Z perpendicular to the main faces of the panel: the higher the degree of crimping, the greater the orientation of the fibers along Z and the more the air flow resistivity is decreased and the Young's modulus increased.

The glass wool panel additionally has a micronaire of between 2.5/5 g and 6/5 g. Preferably, the micronaire is between 3/5 g and 6/5 g, or between 3.5/5 g and 6/5 g, or else between 4/5 g and 5/5 g. Specifically, the more the micronaire increases, the more the air flow resistivity decreases.

The micronaire is representative of the fineness of the fibers. The measurement of the micronaire gives a picture of the specific surface area by means of the measurement of the aerodynamic pressure drop when a given quantity of fibers extracted from an unsized batt is subjected to a given pressure of a gas, in general air or nitrogen. This measurement is standard practice in mineral fiber production units, and is carried out according to the DIN 53941 or ASTM D 1448 standard and uses what is called a "micronaire apparatus".

The glass wool panel additionally has a thickness of greater than or equal to 25 mm, or of greater than or equal to 30 mm, preferably of greater than or equal to 35 mm, or of greater than or equal to 40 mm, or else of greater than or equal to 45 mm. Specifically, the more the density of the panel decreases, the more preferable it is to have a thickness that increases in order to retain a satisfactory surface density. The surface density, or basis weight, is preferably between 4 and 6.5 kg/m².

Optionally, the glass wool panel may be cut through the thickness along a plane substantially parallel to its main faces. In this configuration, the thickness of the glass wool panel before cutting is therefore greater than or equal to 60 mm, preferably greater than or equal to 70 mm, or greater than or equal to 80 mm.

However, preferably, the glass wool panel is not cut through the thickness along a plane substantially parallel to its main faces.

The glass wool panel additionally has a veil on each of its main faces. The veil intended to be facing the side from where the sound to be absorbed originates, referred to as the front veil, has a specific air flow resistance of less than or equal to 1 kPa·s/m, preferably less than or equal to 0.5 kPa·s/m, so as to let as much sound as possible pass through to the glass wool, which will absorb the sound in order to enable a good sound absorption. The opposite veil, referred to as the rear veil, has a specific air flow resistance of greater than or equal to 1 kPa·s/m, preferably greater than or equal to 5 kPa·s/m, or greater than or equal to 10 kPa·s/m: it is preferably airtight so as to provide good sound insulation. An airtight veil has a specific air flow resistance that is infinite, i.e. which is within the limits of what can be measured. The front veil may be painted to improve the esthetics of the panel on the visible face side. The front veil may be adhesively bonded to the front face of the panel after a slight abrading that makes it possible to flatten this face.

The glass wool panel additionally comprises a weight content of binder of between 5% and 15% of the total weight, preferably between 6% and 10% of the total weight.

The glass wool panel has a sound absorption $\alpha_w$ of greater than or equal to 0.9. The sound absorption is measured according to the ISO 354 standard. The indicator $\alpha_w$ is then calculated according to the ISO 11654 standard. Throughout the application, the measurements were carried out with a 200 mm high structural plenum.

The glass wool panel has a sound insulation $D_{nfw}$ of greater than or equal to 38 dB, preferably greater than or equal to 39 dB, or greater than or equal to 40 dB, or else greater than or equal to 41 dB, or greater than or equal to 42 dB. The sound insulation is measured according to the ISO 10848-1 standard. The indicator $D_{nfw}$ is then calculated according to the ISO 717-1 standard. Throughout the application, the measurements were carried out with a 700 mm high structural plenum.

The measurements of sound absorption and insulation are carried out on the panel with the front/rear veils.

The invention also relates to the process for manufacturing the glass wool panel as described above. The process comprises a step of manufacturing a mat of glass fibers by internal centrifugation then a step of crimping the mat of glass fibers with a degree of crimping of between 1.5 and 5.

The step of manufacturing the mat of glass fibers by internal centrifugation is carried out using equipment comprising:
- at least one centrifuge capable of rotating about an axis X, in particular a vertical axis, and the peripheral band of which is pierced by a plurality of orifices for delivering filaments of a molten material,
- a high-temperature gas attenuating means in the form of an annular burner that attenuates the filaments into fibers, and
- a receiving belt associated with suction means for receiving the fibers.

The centrifuge or centrifuges, also referred to as fiberizing spinners, specifically make it possible to form mineral fibers or fibers of other thermoplastic materials, by an internal centrifugation process combined with attenuation by a high-temperature gas flow. Internal centrifugation is applied in particular to the industrial production of glass wool intended to be incorporated for example into the composition of thermal and/or acoustic insulation products. A molten glass flow is introduced into each centrifuge, rotating at high speed and pierced around its periphery by a very large number of orifices through which the glass is ejected in the form of filaments owing to the effect of the centrifugal force. These filaments are then subjected to the action of an annular high-velocity high-temperature attenuating flow hugging the wall of the centrifuge, which flow thins said filaments and converts them into fibers. The fibers formed are entrained by this attenuating gas flow to a receiving device generally consisting of a gas-permeable band, referred to as a receiving belt.

During the step of manufacturing the mat of glass fibers, a combination of parameters is regulated, from among at least:
- the viscosity of the molten glass, which is between 820 and 1500 poise, preferably between 950 and 1200 poise,
- the pressure of the burner, between 200 and 1000 mm WC, preferably between 200 and 600 mm WC,
- the total daily output of glass per centrifuge, which is between 14 metric tons/day and 23 metric tons/day, preferably between 17 and 22 metric tons/day,
- the number of holes of each centrifuge, which is between 5000 and 40 000, preferably between 15 000 and 35 000, and
- the rotational speed of the centrifuge at a speed greater than 2000 revolutions/minute.

These parameters make it possible in particular to adjust the density and the micronaire of the glass wool panel.

Preferably, the diameter of the orifices of each centrifuge is between 0.5 and 1.1 mm. Each centrifuge preferably has a diameter of between 200 and 800 mm.

Moreover, binder is projected onto the glass fibers before they fall onto the receiving belt, with a content of between 5% and 15% of the total weight, preferably of between 6% and 10% of the total weight. The mat of glass fibers is then passed into a drying oven, after crimping, in order to polymerize the binder.

To finalize the product, a veil is adhesively bonded to each of the main faces of the glass wool panel, the specificities of each of the veils having been given above.

A first example according to the invention is a glass wool panel with a density of 117 kg/m$^3$ and a thickness of 50 mm, having an air flow resistivity of 63 kPa·s/m$^2$ and a Young's modulus of 2.3 MPa. The micronaire is 4.3/5 g. The degree of crimping is 3.5. The panel comprises a front veil having a specific air flow resistance of 0.3 kPa·s/m and an airtight rear veil. The sound absorption $\alpha_w$ is 0.9 and the sound insulation $D_{nfw}$ is 42 dB.

A second example according to the invention is a glass wool panel with a density of 102 kg/m$^3$ and a thickness of 52 mm, having an air flow resistivity of 68 kPa·s/m$^2$ and a Young's modulus of 0.9 MPa. The micronaire is 3.6/5 g. The degree of crimping is 3.5. The panel comprises a front veil having a specific air flow resistance of 0.3 kPa·s/m and an airtight rear veil. The sound absorption $\alpha_w$ is 0.95 and the sound insulation $D_{nfw}$ is 41 dB.

Thus, glass wool panels with both a good sound absorption and a good sound insulation have been able to be manufactured.

The invention claimed is:

1. A glass wool panel intended to be used as acoustic panel and having:
   a density of less than or equal to 130 kg/m$^3$,
   an air flow resistivity of between 30 and 120 kPa·s/m$^2$, and
   a Young's modulus of between 0.5 and 4 MPa,
   wherein a surface density of the glass wool panel is between 4 and 6.5 kg/m$^2$.

2. The panel as claimed in claim 1, additionally having a micronaire of between 2.5/5 g and 6/5 g.

3. The panel as claimed in claim 1, additionally having a thickness of greater than or equal to 25 mm.

4. The panel as claimed in claim 1, additionally comprising a veil on each main face of the panel.

5. The panel as claimed in claim 4, wherein the veil intended to be facing a side from where the sound to be absorbed originates having a specific air flow resistance of less than or equal to 1 kPa·s/m, and the opposite veil having a specific air flow resistance of greater than or equal to 1 kPa·s/m.

6. The panel as claimed in claim 1, comprising a weight content of binder of between 5% and 15% of the total weight.

7. The panel as claimed in claim 1, having a sound absorption $\alpha_w$ of greater than or equal to 0.9.

8. The panel as claimed in claim 1, having a sound insulation $D_{nfw}$ of greater than or equal to 38 dB.

9. A process for manufacturing the glass wool panel as claimed in claim 1, comprising:
   manufacturing a mat of glass fibers by internal centrifugation, using equipment comprising:
      at least one centrifuge capable of rotating about an axis X and a peripheral band of which is pierced by a plurality of orifices for delivering filaments of a molten material,
      a high-temperature gas attenuating means in the form of an annular burner that attenuates the filaments into fibers, and
      a receiving belt associated with suction means for receiving the fibers,
   crimping the mat of glass fibers with a degree of crimping of between 1.5 and 5.

10. The process as claimed in claim 9, wherein, during the manufacturing of the mat of glass fibers, a combination of parameters is regulated from among at least:
    a viscosity of the molten glass, which is between 820 and 1500 poise,
    a pressure of the burner, between 200 and 1000 mm WC,
    a total daily output of glass per centrifuge, which is between 14 metric tons/day and 23 metric tons/day,
    a number of holes of each centrifuge, which is between 5000 and 40 000, and
    a rotational speed of the centrifuge at a speed greater than 2000 revolutions/minute.

11. The process as claimed in claim 9, wherein a diameter of the orifices of each centrifuge is between 0.5 and 1.1 mm.

12. The process as claimed in claim 9, wherein each centrifuge has a diameter of between 200 and 800 mm.

13. The process as claimed in claim 9, wherein binder is projected onto the glass fibers before they fall onto the receiving belt, with a content of between 5% and 15% of the total weight, the mat of glass fibers being passed into a drying oven in order to polymerize the binder.

14. The process as claimed in claim 9, wherein a veil is adhesively bonded to each of the main faces of the glass wool panel.

15. The panel as claimed in claim 1, wherein the density is less than or equal to 110 kg/m$^3$, the air flow resistivity is between 50 and 100 kPa·s/m$^2$, and the Young's modulus is between 1.2 MPa and 4 MPa.

16. The panel as claimed in claim 2, wherein the micronaire is between 3.5/5 g and 6/5 g.

17. The panel as claimed in claim 3, wherein the thickness is greater than or equal to 40 mm.

18. The panel as claimed in claim 5, wherein the veil intended to be facing the side from where the sound to be absorbed originates having a specific air flow resistance of less than or equal to 0.5 kPa·s/m, and the opposite veil having a specific air flow resistance of greater than or equal to 10 kPa·s/m.

19. The panel as claimed in claim 6, wherein the weight content of binder is between 6% and 10% of the total weight.

20. The panel as claimed in claim 8, wherein the sound insulation $D_{nfw}$ is greater than or equal to 41 dB.

* * * * *